United States Patent
Domec et al.

(10) Patent No.: US 10,370,754 B2
(45) Date of Patent: Aug. 6, 2019

(54) COATING SYSTEM FOR TUBULAR GRIPPING COMPONENTS

(71) Applicant: Frank's International, LLC, Houston, TX (US)

(72) Inventors: Brennan S. Domec, Houston, TX (US); Jeremy Richard Angelle, Youngsville, LA (US)

(73) Assignee: Frank's International, LLC, Houston, TX (US)

(*) Notice: Subject to any disclaimer, the term of this patent is extended or adjusted under 35 U.S.C. 154(b) by 175 days.

(21) Appl. No.: 15/482,151

(22) Filed: Apr. 7, 2017

(65) Prior Publication Data

US 2017/0211171 A1   Jul. 27, 2017

Related U.S. Application Data

(63) Continuation of application No. 14/292,748, filed on May 30, 2014, now Pat. No. 9,695,650.

(60) Provisional application No. 61/856,420, filed on Jul. 19, 2013, provisional application No. 61/835,976, filed on Jun. 17, 2013, provisional application No. 61/829,029, filed on May 30, 2013.

(51) Int. Cl.
| | |
|---|---|
| *C23C 8/02* | (2006.01) |
| *C23C 8/34* | (2006.01) |
| *C23C 8/36* | (2006.01) |
| *C23C 8/38* | (2006.01) |
| *C23C 8/80* | (2006.01) |
| *C23C 28/00* | (2006.01) |
| *C23C 28/04* | (2006.01) |
| *E21B 19/07* | (2006.01) |
| *E21B 19/10* | (2006.01) |

(52) U.S. Cl.
CPC ............... *C23C 8/34* (2013.01); *C23C 8/02* (2013.01); *C23C 8/36* (2013.01); *C23C 8/38* (2013.01); *C23C 8/80* (2013.01); *C23C 28/042* (2013.01); *C23C 28/044* (2013.01); *C23C 28/36* (2013.01); *E21B 19/07* (2013.01); *E21B 19/10* (2013.01)

(58) Field of Classification Search
CPC ...... E21B 19/10; E21B 19/17; E21B 17/1085; E21B 33/1291
See application file for complete search history.

(56) References Cited

U.S. PATENT DOCUMENTS

| | | | |
|---|---|---|---|
| 6,755,097 B2 * | 6/2004 | Bangert | E21B 19/07 294/102.2 |
| 7,036,397 B2 * | 5/2006 | Bangert | E21B 19/07 81/57.15 |

(Continued)

OTHER PUBLICATIONS https://www.steelexpress.co.uk/steel-hardness-conversion.htnnl, "Steel Harness Conversion", 2018, 7 pages (Year: 2018).*

*Primary Examiner* — Jennifer H Gay
(74) *Attorney, Agent, or Firm* — Osha Liang LLP

(57) ABSTRACT

A gripping tool includes a gripping element and at least one gripping surface formed on the gripping element. The at least one gripping surface includes a plurality of teeth extending from the gripping element an outer layer. A method to surface process a gripping surface of a gripping tool includes providing the gripping surface in an environment comprising a source of additive material and heating the gripping surface at a temperature and a time to diffuse the additive material a depth into the gripping surface to form a diffusion layer.

19 Claims, 6 Drawing Sheets

(56) References Cited

U.S. PATENT DOCUMENTS

| | | | | |
|---|---|---|---|---|
| 8,590,627 B2* | 11/2013 | Jin | ................ | E21B 17/042 |
| | | | | 166/242.4 |
| 2004/0055421 A1* | 3/2004 | Bangert | ................ | E21B 19/07 |
| | | | | 81/57.15 |
| 2004/0194967 A1* | 10/2004 | Jaensch | ................ | B25B 13/5016 |
| | | | | 166/380 |
| 2010/0175926 A1* | 7/2010 | Buske | ................ | E21B 10/16 |
| | | | | 175/374 |
| 2011/0203791 A1* | 8/2011 | Jin | ................ | E21B 17/042 |
| | | | | 166/244.1 |
| 2011/0220348 A1* | 9/2011 | Jin | ................ | E21B 17/042 |
| | | | | 166/244.1 |
| 2014/0216723 A1* | 8/2014 | Badrak | ................ | E21B 33/129 |
| | | | | 166/206 |
| 2014/0290445 A1* | 10/2014 | Tunningley | ................ | E21B 19/161 |
| | | | | 81/90.5 |
| 2014/0352943 A1* | 12/2014 | Domec | ................ | C23C 8/34 |
| | | | | 166/77.51 |
| 2015/0115635 A1* | 4/2015 | Freyvogel | ................ | E21B 19/10 |
| | | | | 294/102.1 |
| 2015/0147495 A1* | 5/2015 | Kumar | ................ | B32B 1/08 |
| | | | | 428/34.1 |
| 2017/0211171 A1* | 7/2017 | Domec | ................ | C23C 8/34 |
| 2018/0128073 A1* | 5/2018 | Frazier | ................ | E21B 33/1291 |

* cited by examiner

COATING SYSTEM FOR TUBULAR GRIPPING COMPONENTS

CROSS-REFERENCE TO RELATED APPLICATIONS

This application is a continuation of and claims priority of an earlier application under 35 U.S.C. § 120, namely U.S. patent application Ser. No. 14/292,748 filed on May 30, 2014. U.S. patent application Ser. No. 14/292,748 in turn claims benefit, under 35 U.S.C. § 119(e), of U.S. Provisional Application Ser. No. 61/856,420, filed on Jul. 19, 2013, and entitled "An Improved Coating System for Tubular Gripping Components," of U.S. Provisional Application Ser. No. 61/835,976, filed on Jun. 17, 2013, and entitled "An Improved Coating System for Tubular Gripping Components," and of U.S. Provisional Application Ser. No. 61/829,029, filed May 30, 2013, and entitled "An Improved Coating System for Tubular Gripping Components." The disclosure of each of these U.S. Provisional Applications is incorporated herein by reference in its entirety.

BACKGROUND

In oilfield exploration and production operations, various oilfield tubular members are used to perform important tasks, including, but not limited to, drilling the wellbore and casing a drilled wellbore. For example, a long assembly of drill pipes, known in the industry as a drill string, may be used to rotate a drill bit at a distal end to create the wellbore. Furthermore, after a wellbore has been created, a casing string may be disposed downhole into the wellbore and cemented in place to stabilize, reinforce, or isolate (among other functions) portions of the wellbore. As such, strings of drill pipe and casing may be connected together, such as end-to-end by welding or by threaded connections, in which a male "pin" member of a first tubular member is configured to threadably engage a corresponding female "box" member of a second tubular member. Alternatively, a casing string may be made-up of a series of male-male ended casing joints coupled together by female-female couplers. The process by which the threaded connections are assembled is called "making-up" a threaded connection, and the process by which the connections are disassembled is referred to "breaking-out" the threaded connection. As would be understood by one having ordinary skill, individual pieces (or "joints") of oilfield tubular members may come in a variety of weights, diameters, configurations, and lengths.

Referring to FIG. 1, a perspective view is shown of an example of a drilling rig 101 used to run one or more tubular members 111 (e.g., casing, drill pipe, etc.) downhole into a wellbore. As shown, the drilling rig 101 includes a frame structure known as a "derrick" 102, from which a traveling block 103 (which may include a top drive) suspends a lifting apparatus 105 (e.g., an elevator or a tubular (e.g., casing) running tool connected to the quill of a top drive) and a gripping apparatus 107 (e.g., slip assembly or "spider") at the rig floor may be used to manipulate (e.g., raise, lower, rotate, hold, etc.) a tubular member 111. The traveling block 103 is a device that is suspended from at or near the top of the derrick 102, in which the traveling block 103 may move up-and-down (i.e., vertically as depicted) to raise and/or lower the tubular member 111. The traveling block 103 may be a simple "pulley-style" block and may have a hook from which objects below (e.g., lifting apparatus 105 and/or top drive) may be suspended. Drilling rig 101 can be a land or offshore rig (e.g., drill ship).

Additionally, the lifting apparatus 105 may be coupled below the traveling block 103 (and/or a top drive if present) to selectively grab or release a tubular member 111 as the tubular member 111 is to be raised and/or lowered within and from the derrick 102. As such, the top drive may include one or more guiding rails and/or a track disposed adjacent to the top drive, in which the guiding rails or track may be used to support and guide the top drive as the top drive is raised and/or lowered within the derrick.

Typically, a lifting apparatus 105 includes movable gripping members (e.g., slip assemblies) attached thereto and movable between a retracted (e.g., disengaged) position and an engaged position. In the engaged position, the lifting apparatus 105 supports the tubular member 111 such that the tubular member 111 may be lifted and/or lowered, and rotated if so equipped. In the retracted position, the lifting apparatus 105 may release the tubular member 111 and move away therefrom to allow the tubular member 111 to be engaged with or removed from the lifting apparatus 105 and/or the gripping apparatus 107. For example, the lifting apparatus 105 may release the tubular member 111 after the tubular member 111 is threadably connected to a tubular string 115 supported by the gripping apparatus 107 (e.g., slip assembly or "spider") at the rig floor at the floor of the drilling rig 101.

Further, in an embodiment in which the drilling rig 101 includes a top drive and a tubular running tool, the tubular member 111 may be supported and gripped by the tubular running tool connected to the quill of the top drive. For example, the tubular running tool may include one or more gripping members that may move radially inward and/or radially outward or have a radial displacement component. In such embodiments, the gripping members or radial displacement components of a tubular running tool may move radially outward to grip an internal surface of the tubular member 111, such as with an internal gripping device, and/or the gripping members or radial displacement components of the tubular running tool may move radially inward to grip an external surface of the tubular member 111, such as with an external gripping device, however so equipped.

As such, the gripping apparatus 107 of the drilling rig 101 may be used to support and suspend the tubular string 115, e.g., by gripping, from the drilling rig 101, e.g., supported by the rig floor 109 or by a rotary table thereof. The gripping apparatus 107 may be disposed within the rig floor 109, such as flush with the rig floor 109, or may extend above the rig floor 109, as shown. As such, the gripping apparatus 107 may be used to suspend the tubular string 115, e.g., while one or more tubular members 111 are connected or disconnected from the tubular string 115.

FIGS. 2A and 2B show an example of a gripping device 201 that includes a bowl 203 with a plurality of slip assemblies 205 movably disposed therein. Specifically, the slip assemblies 205 may be connected to a ring 207, in which the ring 207 may be connected to the bowl 203 through an actuator (e.g., actuator rods) 209. Actuator may be actuated, such as electrically actuated and/or fluidly (e.g., hydraulically) actuated, to move up and/or down with respect to the bowl 203, in which the slip assemblies 205 connected to the ring 207 may correspondingly move up and/or down with respect to the bowl 203.

The illustrated slip assemblies 205 are designed to engage and contact the inner tapered surface of the bowl 203 when moving with respect to the bowl 203. Bowl 203 is shown as a continuous surface but may comprise non-continuous surfaces (e.g., a surface adjacent to the rear of each slip assembly 205). Thus, as the slip assemblies 205 move up or down with respect to the bowl 203, the slip assemblies 205 may travel down along an inner surface of the bowl 203. With this movement, an inner surface (e.g., die or insert) of the slip assemblies 205 will grip a tubular member 211 disposed within the gripping device 201. The slip assemblies 205 may have a gripping surface (e.g., teeth) on the inner surface to facilitate the gripping of the tubular member 211. After the tubular member 211 is supported by the gripping device 201, additional tubular members may be connected or disconnected from the tubular member 211.

As shown with respect to FIGS. 2A and 2B, the gripping device 201 may be used to grip tubular members 211 having multiple outer diameters. For example, as shown in FIG. 2A, the slip assemblies 205 may be positioned within the bowl 203 of the gripping device 201 to grip a tubular member 211A having a first diameter D1. As discussed, the slip assemblies 205 may be positioned using the ring 207 that may be vertically moveable, e.g., through the actuator rods 209. FIG. 2B shows gripping device 201, in which the slip assemblies 205 are positioned vertically higher within the bowl 203 with respect to the positioning of the slip assemblies 205 shown in FIG. 2A. As such, this positioning of the slip assemblies 205 in FIG. 2B enables the gripping device 201 to grip another tubular member 211B, in which the tubular member 211B has a second outer diameter D2 larger than the first outer diameter D1 of the tubular member 211A (for example, where D1 and D2 are on a tubular body itself and not a connector portion thereof). Thus, gripping device 201 may grip tubular members 211 having a large range of outer diameters without the need of reconfiguration and/or adding supplemental equipment to the gripping device 201. However, in some gripping devices, various sizes of inserts and/or slip assemblies may be interchanged.

From time-to-time, drillstring, casing, completion tubing, etc. must be raised or "tripped" out of the hole, such as when changing the drill bit at the end of the string. As the drillstring is brought out of the hole, the various tubular members are removed from the string and set aside in or around the drilling rig. However, when doing this, the tubular members may have drilling fluids and/or debris deposited thereon, such as oil or water-based mud and cuttings from the drilled underground formations.

Further, generally a pipe string may be disposed and suspended within a borehole from a drilling rig using a pipe handling apparatus, such as a spider, in which the pipe string may be lengthened step-wise by threadably joining or welding a tubular segment to the proximal end of the pipe string at the rig. The pipe string may be suspended within the drilling rig using a second type of pipe handling apparatus, such as an elevator, that is movably supported from a draw works and a derrick above the spider. As the load of the pipe string is transferred between the spider and the elevator, the spider may be unloaded and then disengaged from the pipe string by retraction of the slips within the spider. The lengthened pipe string may then be lowered further into the borehole using the draw works controlling the elevator. The spider may then again engage and support the pipe string within the borehole and an additional tubular segment may be joined to the new proximal end of the pipe string to further lengthen the pipe string.

SUMMARY

In one aspect, embodiments disclosed herein relate to a gripping tool that has a steel body and at least one gripping surface formed on the body, wherein the at least one gripping surface includes a plurality of teeth extending from the body, a boronized layer extending a depth from an outer surface of the gripping surface, wherein the boronized layer comprises at least one of $Fe_2B$ and $FeB$; and a carburized layer extending from the boronized layer to the body, wherein the carburized layer comprises a carbon content greater than the steel body.

In another aspect, embodiments disclosed herein relate to a gripping tool having a body and at least one gripping surface formed on the body, wherein the at least one gripping surface includes a plurality of teeth extending from the body, at least one outer layer disposed on the plurality of teeth, wherein the at least one outer layer comprises a non-ferrous material, and a carburized layer extending from the at least one outer layer to the body.

In yet another aspect, embodiments disclosed herein relate to a method of manufacturing a gripping tool that includes carburizing a gripping surface of the gripping tool, wherein carburizing includes providing the gripping surface in an environment comprising a carbon source and heating the gripping surface at a temperature and a time to form a carburized layer, quenching the carburized layer, and forming an outer layer on the carburized layer.

Other aspects and advantages of the invention will be apparent from the following description and the appended claims.

DETAILED DESCRIPTION

Figure 1:
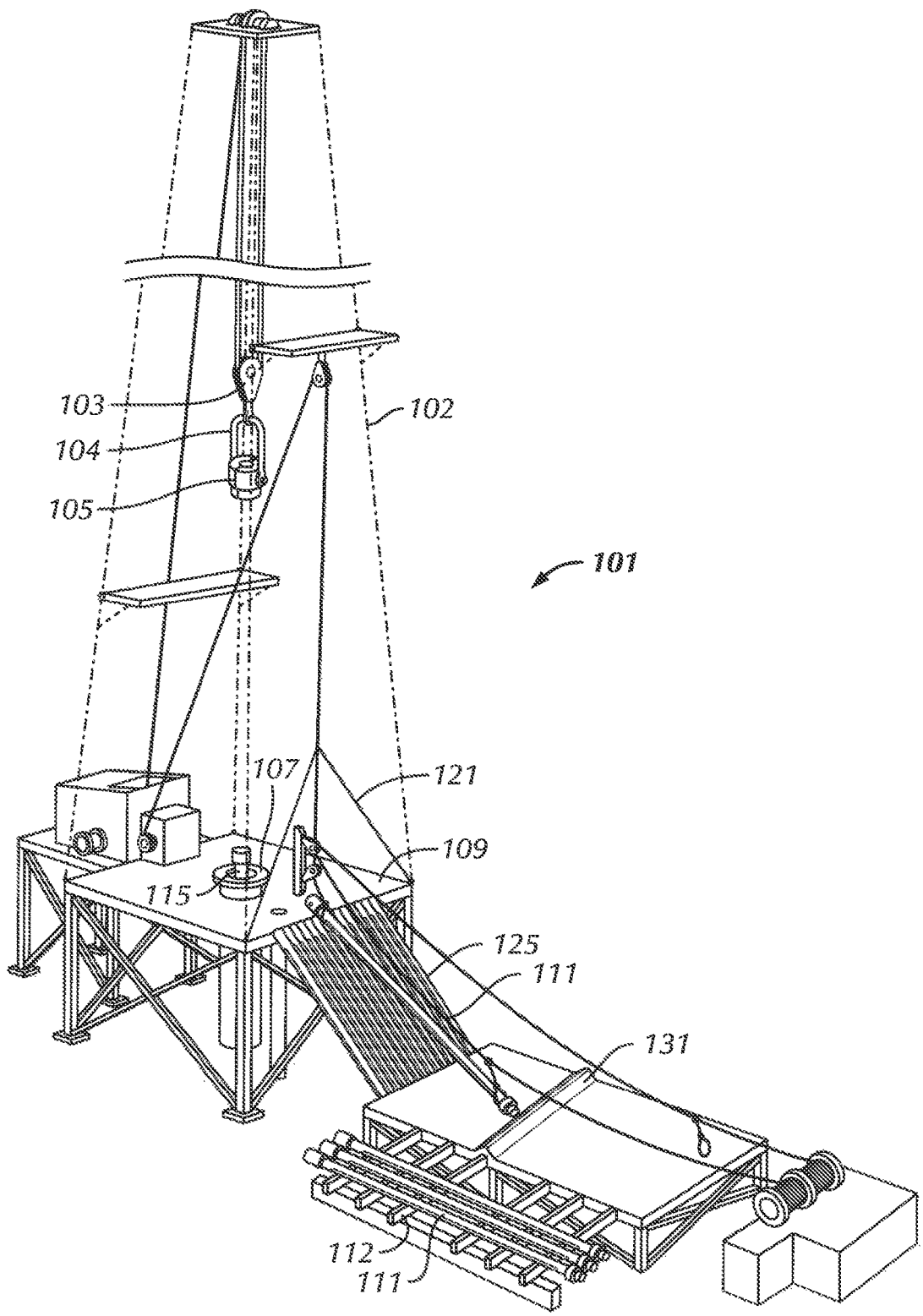
FIG. 1 is a schematic view of a drilling rig.
Figure 2A:
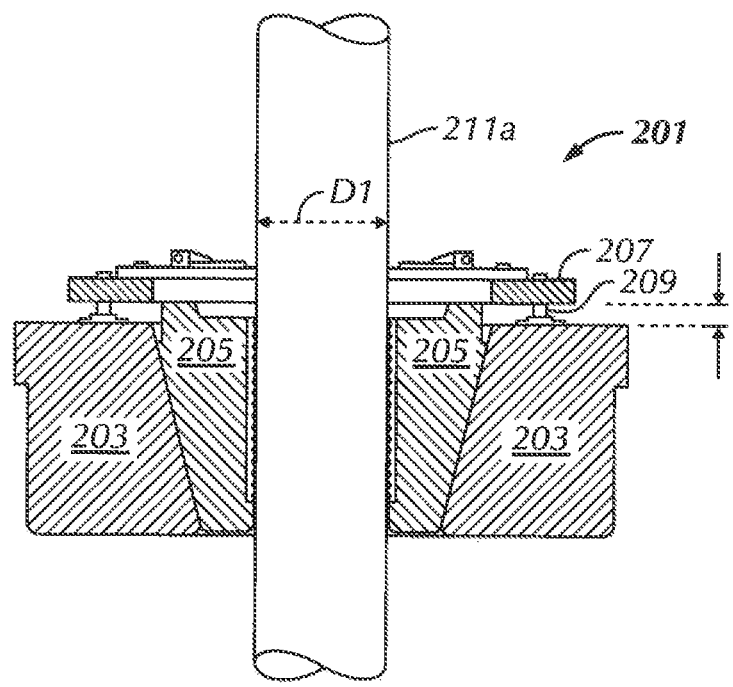
FIGS. 2A and 2B show perspective views of a gripping apparatus.
Figure 2B:
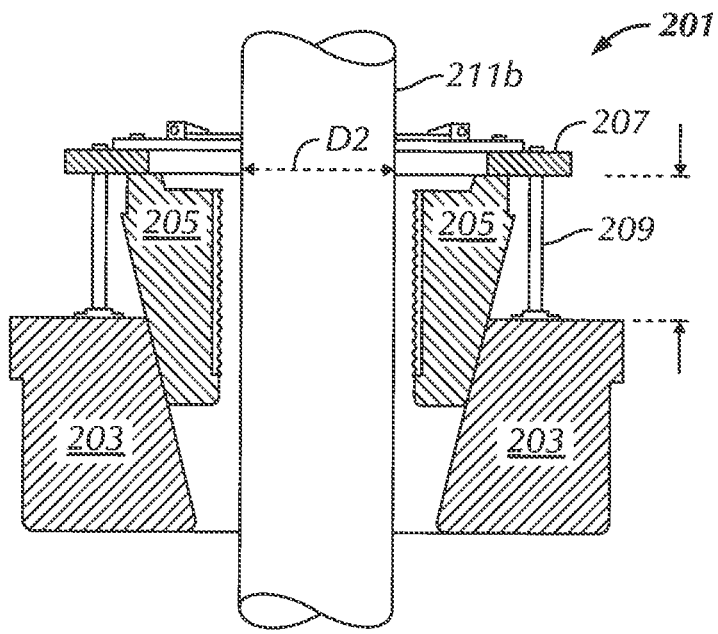

Embodiments of the present disclosure relate generally to surface processing methods. Surface processing methods of the present disclosure may be used, for example, on tongs, dies, backups, removable inserts and dies as well as slips or jaws with teeth, dies or slips integrally formed to a gripping tool, inserts, slip assemblies or dies used with spiders or elevators, gripping tools that can grip from the inner diameter of a tubular member, gripping tools that can grip from the outer diameter of a tubular member, or other tools that may be used to grip corrosion resistant alloy ("CRA") tubulars. Further, surface processing methods of the present disclosure may be used on gripping elements that grip using transverse or rotational loading, longitudinal loading, or any other type or combination of directional loading. Other embodiments of the present disclosure relate to gripping tools formed of non-ferrous materials that do not need surface processing.

CRA tubulars may be formed of stainless steels or other materials having high alloy contents of elements, such as chromium and nickel, to prevent corrosion. Such materials, for example, 13-chrome stainless steels, may have a hard outer layer, which conventional gripping tools have difficulty penetrating, and thus, may lead to slippage and damage to the tubular. For example, CRA tubulars may have an outer layer hardness ranging from about 55 to 65 HRC, or 50 to 75 HRC equivalent (e.g., 600 HV-830 HV or 510 HV-1500 HV). Conventional gripping tools, however, such as case carburized gripping tools, have an outer gripping surface that is softer than CRA tubular outer layers. For example, an outer gripping surface of a conventional case carburized gripping tool may have a hardness no greater than about 62 HRC equivalent (e.g., 750 HV), which decreases along the depth of the gripping surface to the core hardness of the substrate. Thus, although conventional case carburized gripping tools may initially penetrate CRA tubular outer layers, they quickly blunt and wear down to such an extent that repetitive gripping is inhibited. Further, the conventional gripping tools may be formed of a ferrous material, such as carburizing steel, which may transfer to the CRA tubular being gripped and may eventually lead to corrosion. By providing inserts, dies, or other gripping tools with a surface processing system of the present disclosure, the gripping tool may be provided with strength sufficient to penetrate the outer surface of a tubular and properly grip the tubular with reduced slippage while also reducing or preventing the transfer of ferrous or deleterious material and maintaining sufficient ductility to resist fracture. Further, treatments disclosed herein may provide the gripping surface with sufficient hardness to penetrate oxide layers on 13-Cr alloys, reduce friction, thereby reducing potential for slip crush and facilitating penetration, and also provide improved wear resistance.

Surface processing methods described below may be used to treat the outer surface of a gripping tool to tie up residual free iron at the outer surface, thereby reducing or preventing its transfer to the CRA material. However, some embodiments disclosed herein having a gripping surface formed of non-ferrous material that may or may not be surface processed. Material treatments disclosed herein may be applied to both ferrous and non-ferrous alloys, and non-ferrous alloys can be used with or without material treatment, as disclosed herein, depending on the application of the non-ferrous alloy. The use of non-ferrous alloys may reduce or eliminate iron transfer potential and may require a treatment to prevent wear depending on the alloy chosen.

Figure 3A:
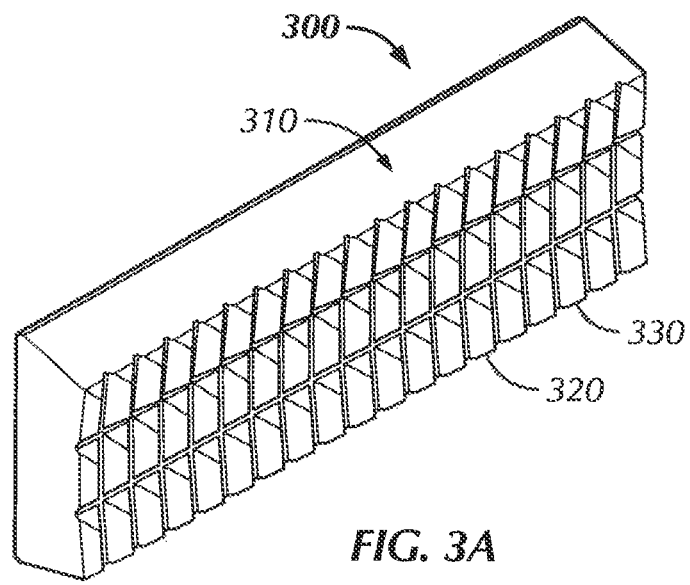
FIGS. 3A and 3B show a perspective view and a cross-sectional view, respectively, of a gripping tool according to embodiments of the present disclosure.
Figure 3B:
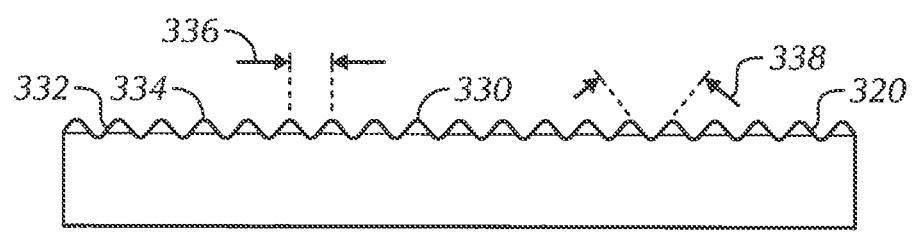

Referring now to FIGS. 3A and 3B, a perspective view and cross-sectional view, respectively, of a gripping tool 300 according to embodiments of the present disclosure are shown. The gripping tool 300 may be used within tubular handling and/or gripping equipment, such as a slip assembly or die used with a spider or an elevator, or other tool used to grip corrosion resistant alloy ("CRA") tubulars. The gripping tool 300 has a body 310 and a gripping surface 320, in which the gripping surface 320 includes a plurality of teeth 330 extending from the body 310. According to embodiments of the present disclosure, the gripping surface 320 may be subjected to either a first surface coating or a first diffusion layer and may be followed by at least one additional coating or diffusion layer. For example, in some embodiments, teeth of a gripping surface may be carburized to form a carburized layer extending from the teeth outer surface to the body. An additional diffusion layer, e.g., a boronized layer or a nitridized layer, may then be formed on the carburized layer, or a coating may be applied to the carburized layer. According to embodiments of the present disclosure, a first inner layer may provide structural support to a second outer layer, and the second outer layer may provide enhanced gripping ability and wear resistance and act as a buffer from transfer of ferrous or other deleterious material.

As shown in FIG. 3B, each of the teeth 330 has side surfaces 332 transitioning to an apex 334, in which the apex 334 has a curvature sufficient to penetrate and grip a CRA material. The cross sectional shape of an apex may include, for example, triangular or parabolic shapes. Further, the teeth 330 may be uniformly or non-uniformly positioned along the gripping surface 320, as measured between points at the same position on the apexes 334 of adjacent teeth 330. For example, in some embodiments, teeth 330 may be spaced uniformly along a gripping surface 320 such that the distance 336 between the apexes of adjacent teeth 330 range from about 0.05 to about 0.8 inches apart. In some embodiments, the distance 336 between uniformly spaced teeth 330 may range from about 0.06 to about 0.20 inches apart. According to some embodiments of the present disclosure, teeth may be micro-sized, for example, ranging less than 0.06 inches apart. However, in other embodiments, larger sized teeth may be used, for example, teeth having a pitch ranging from 0.06 to 0.2 inches, or teeth having a pitch greater than 0.2 inches. In some embodiments, teeth may be uniformly spaced along a gripping surface, where the teeth have a pitch ranging from 0.08 inches to 0.2 inches and a height ranging from 0.03 inches to 0.1 inches. For example, a gripping surface may have uniformly spaced teeth with a pitch ranging from 0.09 to 0.12 and a height ranging from 0.035 to 0.04 inches, or a pitch ranging from 0.17 to 0.19 inches and a height ranging from 0.06 to 0.09 inches. Advantageously, gripping surface treatments disclosed herein may provide enhanced gripping performance for teeth sizes disclosed above, as well as other size and shape combinations. Uniformly spaced teeth on a gripping surface may allow for easier cleaning and manufacturing of the gripping surface, while still maintaining effective grip. Further, fine-point teeth (teeth having a pointed tip, either angular or tight radius of curvature) along a gripping surface may facilitate penetration into a surface to be gripped by virtue of the high contact pressure generated at the tips of the teeth.

The use of toothed gripping surfaces over other gripping surfaces, such as grit-faced gripping surfaces, may allow for more evenly distributed penetration into the surface being gripped. For example, grit faced manufacturing may result in random orientation of high hardness particles varying in size. The random orientation and mix of particles sizes may result in a non-uniform surface with peaks of varying height overlayed an otherwise uniform surface, where the highest peaks provide relatively few points of contact with the surface to be gripped, thereby leading to increased likelihood of fracture of the gripping particles or wear of the gripping particles. As the particles making initial contact degrade due to fracture or wear, additional peaks make contact with the surface being gripped. In contrast, toothed gripping surfaces according to some embodiments of the present disclosure may include teeth formed along the gripping surface that are machined to have a uniform tooth height, where the height of each tooth is equal, thereby resulting in more uniform contact between the gripping peaks and the surface being gripped. The relatively uniform contact between the gripping peaks and the surface being gripped may help to avoid degradation of the gripping peaks over time with cycles of use.

Each tooth 330 may also have a uniform or non-uniform profile. For example, as shown in FIG. 3B, each tooth 330 may have a uniform profile, in which the angle of separation 338 formed between side surfaces of adjacent teeth may be equal among all adjacent teeth along the gripping surface 320. An angle of separation 338 formed between the side surfaces 332 of adjacent teeth 330 may range, for example, from about 30 degrees to about 100 degrees, depending on the size and amount of teeth formed on the gripping surface 320. For example, a gripping surface 320 having a relatively high amount of teeth 330 formed thereon may have smaller angles of separation 338 than a gripping surface of the same length with a relatively smaller amount of teeth formed thereon. By forming one or more layers on a gripping surface having uniform angles of separation between the teeth of the gripping surface, loads from gripping may be more uniformly distributed along the gripping surface. Further, uniform tooth profiles may allow for easier cleaning of the gripping surface when compared with grit-faced products which may tend to clog.

As used herein, a "surface processing" method refers to a method of coating or chemically altering a surface. As used herein, "coating" a surface refers to attachment of at least one material to the surface (e.g., applying a coating to the surface), and "chemically altering" a surface refers to chemical treatment of the surface. Thus, although coatings may be chemically attached to a surface (e.g., via metallurgical bonding), "coating" a surface is distinct from chemically altering a surface.

For example, in some embodiments, a surface processing method may include chemically altering a surface by diffusing a chemical (a chemical element and/or chemical composition) a depth into a material. As described more below, diffusing a chemical into the material may result in the formation of a diffusion layer extending the depth into the material, in which the formed layer has a distinct microstructure from the original surface material. Using one or more diffusion processes to treat the outer surface of a gripping tool may avoid adhesion problems that can be experienced with other methods of treating a surface, such as grit-facing or brazing an outer layer to the gripping tool. Further, in chemical diffusion treatments, the chemical diffuses into an outer surface of the material a depth into the material to form the diffusion layer. Thus, upon formation of the diffusion layer, the outer surface of the pre-diffused material becomes the outer surface of the diffusion layer, i.e., the outer surface remains the same surface but with a different material composition. Accordingly, the term "outer surface" is used herein to refer to the outermost surface of a region being described in its current processing state. For example, an outer surface of a pre-treated material may be referred to as an outer surface of a carburized layer once the material has been carburized and may be referred to as an outer surface of a boronized layer once the carburized layer has been boronized.

In contrast, the outer surface of a material does not become the outer surface of layers that are coated on or attached to the material. For example, in some embodiments, a surface processing method may include altering a surface by applying one or more coatings over the outer surface of a material body, in which the outermost surface of the coating forms a new outer surface of the material body. According to some embodiments of the present disclosure, a first coating may be applied to a base material, and a second coating may be applied to the first coating, in which the first coating may act as a support and transition region for the outer second coating. In some embodiments, a single coating may be applied to a base material. Further, in some embodiments, one or more coatings may be applied to a diffusion layer.

Diffusion Surface Processing

According to embodiments of the present disclosure, a base material, such as the gripping surface of a gripping tool, may be diffused with a diffusion material to alter the composition of the surface, which may be referred to herein as diffusion processing. As described more below, diffusion materials may include, for example, carbon, boron, nitrogen, aluminum, silicon, chromium, titanium or combinations thereof. Diffusion processing is a type of surface processing that may include providing the gripping surface in an environment with a diffusion material source and under conditions sufficient for the diffusion material to diffuse a depth into the gripping surface, thereby forming a diffusion layer. For example, some diffusion processes may include providing the gripping surface in an environment with a diffusion material and heating the gripping surface at a temperature and a time to diffuse the diffusion material a depth into the gripping surface to form a diffusion layer. Some diffusion processes may also include quenching or cooling the gripping surface. One or more diffusion processes may be used to surface process a gripping element. Further, one or more additional processing methods disclosed herein, e.g., other surface processing methods such as coating, may be used in combination with diffusion processing.

Various diffusion processes are described below in more detail, including, for example, carburizing, boronizing, and nitridizing. However, diffusion materials other than or in addition to carbon, boron and nitrogen may be used to form one or more diffusion layers in a gripping tool of the present disclosure using diffusion processes similar to those described with respect to carburizing, boronizing and nitridizing below. Generally, an outer surface of a gripping element may be subjected to an environment containing a diffusion material source sufficient for the diffusion material to diffuse a depth into the gripping element. One or more subsequent diffusion processes may be conducted on a gripping element to form multiple diffusion layers. For example, according to embodiments of the present disclosure, a gripping tool may include a gripping element with a plurality of teeth extending from the gripping element and a diffusion layer extending a depth from an outer surface of the gripping element to a base material of the gripping element. The diffusion layer may include, for example, a carburized layer, nitrided layer, a nitrocarburizing layer, a boronitrided layer, an aluminized layer, a nitroaluminized layer, a siliconized layer, a borochromatized layer, or a borochromtitanized layer, or a boronized layer. One or more subsequent diffusion layers may then be formed on the first diffusion layer. In embodiments having more than one diffusion layer formed thereon, the diffusion processes may be controlled to have each subsequent diffusion layer extend a depth less than the previously formed diffusion layer, such that the last diffusion layer formed extends a depth from the outer surface of the gripping element and the first diffusion layer formed is adjacent to the base material.

For example, according to embodiments of the present disclosure, a base material, such as the gripping surface of a gripping tool, may be carburized to form a carburized layer. In one or more embodiments, treatments that are part of the base material or base metal (e.g., carburization) may be more resilient than coatings/platings and may be more difficult to remove than coatings/platings. The carburized layer may act as a support and/or transition layer for one or more outer layers or the carburized layer may form the outer layer. For example, in some embodiments, a carburized layer may act as a support and/or transition layer for an outer layer having a hardness greater than the carburized layer. As described more below, an outer layer formed on a carburized layer may include using a chemical surface processing method, such as forming a diffusional layer on the carburized layer, or may include using other surface processing methods, such as applying a coating to the carburized layer.

Materials that may be carburized include relatively low carbon content materials, such as steel having a carbon content ranging from about 0.08 percent by weight to about 0.35 percent by weight. Carburizing materials with low carbon content may include, for example, plain carbon steel, mild steel, resulfurized steel, low carbon steel, medium carbon steel, low alloy steel, chromium alloy steel, chromium-molybdenum alloy steel, chromium-nickel-molybdenum alloy steel, other steels having corrosion resistant additives added thereto, nickel chromium alloys, nickel molybdenum alloys and special alloys. As used herein, "carburizing steel" refers to steel having carbon content low enough to have carbon diffused therein during a carburization process. Further, carburizing steel may include steel phases of pearlite, ferrite, cementite, and/or austenite phases, carbide, boride, bainite, and martensite. One skilled in the art may appreciate that depending on the particular composition of carburizing steel and processing conditions, such as heating and cooling rates, various phases of steel may be present, as referenced, for example, in steel phase diagrams known in the art.

According to embodiments of the present disclosure, carburizing steel may be subjected to a carburization process. Various carburizing processes are known in the art, which include heating a relatively low carbon-containing base material in a carbon rich environment for a sufficient time to allow carbon to diffuse into the base material. For example, during a carburization process, a carburizing steel may be heated in a carbon rich atmosphere such that carbon diffuses into the carburizing steel. In some embodiments, the carburizing environment may have a vacuum applied thereto (referred to as vacuum carburizing). As carbon diffuses into the carburizing steel, various alloy carbides, such as those in the form of MC, $M_3C$, $M_{23}C$, etc., may result. The depth of a carburized layer may range, for example, from about 0.01 inches to about 0.2 inches. In some embodiments, a carburized layer may have a depth ranging from about 0.03 inches to about 0.125 inches. The depth of carburization may depend on, for example, the initial amount of carbon content in the gripping surface (i.e., the carbon content of the gripping surface before the carburizing process), the composition of the gripping surface (including, for example, amount and type of metal additives), the geometry of the gripping surface, and the processing conditions, such as the duration, temperature, pressure, and heating and cooling rates.

Upon completing a carburization process (i.e., increasing the amount of carbon in a base material by diffusing carbon therein to form a carburized layer), the carburized layer may subsequently be quench hardened. For example, upon carburizing steel, the carburized steel may be quenched to a temperature sufficient to initiate transformation of at least part of the carburized steel into martensite. In such embodiments, a carburized layer of relatively high carbon content martensitic steel results from quenching the carburized steel and extends substantially the depth of carbon diffusion from the carburization process, depending on, for example, temperature and cooling rate parameters. For example, an outer layer of steel or other iron alloy may be heated to form austenite and may have carbon diffused into the surface, where upon quenching the outer layer, a hardened outer layer of plate and/or lath martensite extending a depth into the base material may be formed. Quenching may include cooling the carburized steel at a constant rate. Further, quenching may include cooling the carburized steel in a gas, e.g., nitrogen, helium, and hydrogen, or liquid, e.g., oil or salt bath. Optionally, furnace cooling may be performed prior to quenching.

A carburized layer may have various features that are distinct from a base material that has not undergone carburization. For example, a carburized layer is formed by diffusing carbon into a relatively low carbon content material, and thus may have a diffusion-type carbon gradient through the thickness of the layer. The diffusion-type carbon gradient may have relatively higher carbon content at the outer surface of the layer and a decreasing carbon content moving toward the interior of the layer to the interface between the carburized layer and the base material. Because the diffusion-type gradient may gradually transition to the base material, the interface between the carburized layer and base material may be approximately determined by measuring the hardness at various radial positions along the carburized layer and base material. Further, because diffusion includes treating a base material rather than bonding a separate material to the base material, a diffusion layer may be less likely to delaminate or crack off. A carburized layer may have a carbon content ranging from about 0.5 percent by weight to about 1.25 percent by weight, depending on the composition of the base material and the carburization parameters used. Further, a carburized layer may have a hardness greater than the base material, which may gradually decrease corresponding to a diffusion-type gradient formed through the thickness of the layer. For example, a carburized layer may have a hardness ranging from about 50 HRC to about 65 HRC (e.g., 510 HV-830 HV), while the base material may have a hardness ranging from about 20 HRC to about 45 HRC (e.g., 240 HV-450 HV).

A carburized layer may also have improved corrosion resistance compared with the base material. For example, in some embodiments, a carburized layer may be free from carbide precipitates, which may allow a sufficient amount of free chromium or other corrosion resistant additives such as molybdenum, and niobium for corrosion protection. In other embodiments, corrosion resistant additives may form carbides in the carburized layer. Whether a carburized layer includes carbides or free carbon depends on, for example, carburization processing time and temperature and base material composition.

According to one or more embodiments, the outer surface of a gripping element may be carburized to form a carburized outer layer. In other embodiments, a carburized layer formed in a gripping element may be surface processed with one or more additional methods disclosed herein, such as by one or more subsequent diffusion processes and/or by one or more coating processes.

According to embodiments of the present disclosure, the outer surface of a gripping element may be boronized, or diffused with a boronizing variant, such as a boron chromium compound, boron aluminum compound, boron titanium compound, or boron nitrogen compound, or any combination thereof. The boronizing process may include heating the surface material in the presence of a boron source such that boron diffuses into the surface material. Boron sources may include, for example, a pack or paste, salt, gas, etc. Further, boron sources may include variants of boron, including, for example, boron chromium and boron nitride, wherein the boron variants are diffused a depth into the outer surface of the gripping element during the diffusion process. Depending on the process being used, boronizing temperatures may range, for example, between approximately 1300° F. and 1830° F. As the boron diffuses into the surface material, boron may react with the surface material to form borides of the surface material, such as iron and alloying elements in a steel surface material. For example, in some embodiments, carburized steel may be boronized, and as boron diffuses into the carburized steel, FeB and/or $Fe_2B$ is formed from reaction between iron in the steel and boron. However, in some embodiments, a boronized layer, or a boronizing variant diffusion layer may be formed directly on a gripping element base material.

Figure 4:
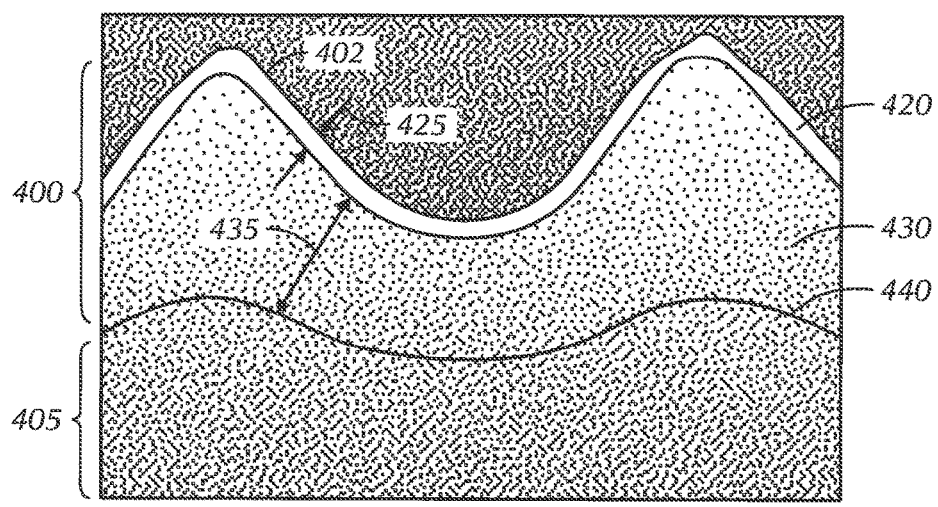
FIG. 4 shows a picture of a gripping surface under 25× magnification according to embodiments of the present disclosure.

In embodiments having a boronized layer formed on a carburized layer, the boronizing process is performed on the carburized layer prior to quenching. In other embodiments, a boronized layer may be formed on a surface material that has not been carburized. The thickness of the boronized layer, or boronizing variant diffusion layer, depends on, for example, the temperature, treatment time, the boron potential used in the boronizing process, and diffusion gradient between the boron source and surface (alloying content). Referring now to FIG. 4, a picture of a gripping surface 400 having a carburized layer 430 and/or a boronized layer 420 formed thereon under 25× magnification is shown. As shown, the gripping surface 400 is formed on a gripping tool body 405, in which the gripping surface 400 includes a plurality of teeth 410 extending from the body 405. The boronized layer 420 extends a depth 425 from an outer surface 402 of the gripping surface 400. The depth 425 may be less than about 0.001 inches. However, in some embodiments, a boronized layer may have a depth greater than about 0.001 inches, for example, ranging between about 0.003 inches and about 0.010 inches. The carburized layer 430 extends a depth 435 from the boronized layer 420 to the body 405. The carburized layer 430 has a carbon content that is greater than the body 405.

Further, as shown, the carburized layer 430 may transition to the body 405 at an interface 440, in which the thickness of the carburized layer 430 is measured from the outer surface 402 to the interface 440. As described above, the interface 440 may be generally determined by measuring the position at which the material hardness substantially equals the hardness of the base material of the body. The interface 440 of the embodiment shown in FIG. 4 may be non-planar, such as to approximately correspond with the non-planar outer surface 402 of the teeth 410. Particularly, as shown, the interface 440 has apexes substantially corresponding with the apexes of the teeth 410, in which the radius of curvature of the interface apexes are larger than the radius of curvature of the teeth apexes. As described above, such an interface may be formed from a carburization process by the diffusion of carbon through an outer surface to a thickness into the body or other diffusion process. As used herein, the term "thickness" may refer to a dimension extending from an outer surface of a material towards the interior of the material. For example, the thickness of the gripping surface 400 shown in FIG. 4 may be measured from the outer surface 402 to the interface 440. When carburizing gripping surfaces having teeth formed thereon, carbon may diffuse through the outer surface of the teeth. As carbon diffuses through the outer surface of the teeth, the diffusion paths from opposite sides of each tooth may overlap, thus creating a non-planar interface having apexes with a relatively larger radius of curvature than each corresponding tooth. According to embodiments of the present disclosure, an interface between a carburized layer and body may be planar or non-planar and/or substantially correspond with the outer surface of the carburized layer.

Referring still to FIG. 4, the hardness of the carburized layer 430 may be greater than the hardness of the body 405. For example, the carburized layer 430 may be formed of a carburized steel having a hardness ranging from about 50 HRC to about 65 HRC (e.g., 510 HV-830 HV), and the body may be formed of a steel having a hardness ranging from about 20 HRC to about 45 HRC (e.g., 240 HV-450 HV). According to embodiments of the present disclosure, the difference in hardness between a carburized layer and the body may range from about 10 HRC to about 40 HRC (e.g., 100 HV-450 HV), when measured at the hardest points of the carburized layer and the body. The boronized layer 420 may have a hardness ranging from about 900 HV-2200 HV. As used herein, the hardness of layers in a gripping tool may be determined by taking micro-hardness measurements along the material layer.

According to some embodiments of the present disclosure, a gripping element may be borochromatized to form a borochromatized outer layer. In such embodiments, a boron and chromium source may be packed around the outer surface of a gripping element and subjected to heat for a time sufficient to allow boron and chromium to diffuse a depth into the surface. According to one or more embodiments, multi-component boriding processes may include boroaluminizing, borosiliconizing, borochromizing, and borochromtitanized structural steel alloy. Boroaluminizing may involve boriding followed by aluminizing (e.g., a compact layer formed in steel parts), which may provide wear resistance and corrosion resistance, including in humid environments. Borosiliconizing may result in the formation of FeSi in a surface layer, which may enhance a corrosion-fatigue strength of treated parts. Borochromizing may involve chromizing after boriding and may provide oxidation resistance. The most uniform layer (which, e.g., may include a solid-solution boride containing iron and chromium) may provide improved wear resistance and enhanced corrosion-fatigue strength. A post-heat-treatment operation may be safely accomplished without a protective atmosphere. Borochromtitanized structural alloy steel may provide high resistance to abrasive wear and corrosion as well as extremely high surface hardness (e.g., up to 5000 HV). The microstructure of borochromtitanized constructional alloy steel may exhibit titanium boride in the outer layer and iron-chromium boride beneath it. Further, one or more embodiments disclosed herein may include borovanadized and/or borochromvanadized layers, which may be ductile and may have a hardness exceeding 3000 HV, which may reduce the danger of spalling under impact loading conditions. As such, the diffusion layer, according to one or more embodiments disclosed herein, may include any of these aforementioned layers.

In some embodiments, the outer surface of a gripping element may be subjected to a nitriding diffusion process. Nitriding is a surface processing method that includes the diffusion of nitrogen into the surface at a temperature for a period of time. Depending on the material being nitridized, environment and other processing conditions, nitriding temperatures may range, for example, from about 450° C. to about 700° C. Nitrogen sources may include, for example, ammonia, liquid salt baths, nitrogen plasma sources. In embodiments using liquid salt baths as a nitrogen source, nitriding temperatures may be higher than 550° C.

According to embodiments of the present disclosure, a gripping surface may have a carburized layer formed thereon and an additional diffusion layer formed on the carburizing layer. For example, as described above, a boronized layer may be formed on a carburized layer of a gripping surface. However, in some embodiments, a carburized layer may have a nitridized layer formed thereon. A nitridized layer may be formed by a nitriding process known in the art, which includes, generally, heating the surface in a nitrogen rich environment at a temperature and time sufficient for the nitrogen to infiltrate the surface. For example, a carburized layer may have a nitridized layer formed thereon by subjecting the carburized layer to a gas nitriding, salt bath nitriding, or plasma nitriding process.

Advantageously, forming one or more diffusional layers on the teeth of a gripping surface may provide adequate support for additional outer layers and increased hardness, while also avoiding adhesion problems present in various coating methods. Alternatively, a diffusion layer may form the outer layer of a gripping element, without subsequent surface processing.

Additionally, carburizing teeth of a gripping surface according to embodiments of the present disclosure may provide a support for additional layers either formed or attached to the teeth. For example, in embodiments having a gripping surface carburized and subsequently boronized, the depth and gradual transition to the hardness of the body in the carburized layer may provide support for the boronized layer. Further, a boronized outer layer may provide a reduction in the friction coefficient of the teeth on a gripping surface, thereby decreasing the force required to penetrate the material being gripped, and thus reducing the potential for slip crush, such as when one or more slip assemblies deforms or crushes a tubular being gripped. Diffusion layers formed on a gripping surface according to embodiments of the present disclosure may also provide improved wear resistance and buffer benefits.

By providing the carburized layer as a support layer for additional outer layers, such as described herein, teeth of a gripping surface may have increased hardness while also being able to better withstand highly loaded or compressive applications. Additional layers formed or disposed on a carburized layer may include a diffusion layer, such as a boronized or nitridized layer described above, or an outer layer attached to the carburized layer, such as described below. In some embodiments, a surface material may have a single diffusion layer, which may or may not be a carburized layer. For example, in some embodiments, a gripping surface may have a boronized layer with an outer layer attached or coated to the boronized layer.

As mentioned above, treating a gripping surface with one or more diffusion processes may provide the gripping surface with enhanced gripping capabilities and decreased iron transfer, while also being less likely to delaminate or crack than coating or plating processes, as the diffusion process results in a layer formed from the base material. During the diffusion processes, atoms are diffused into a base material to alter the microstructure and material properties of the base material in the resulting diffusion layer. Thus, the diffusion layer is formed as part of the base material, where the diffused atoms are diffused into the base material rather than applied as a surface layer that can more easily be worn or chipped away.

Other Surface Processing

According to embodiments of the present disclosure, one or more outer layers may be coated or otherwise applied on a gripping surface of the present disclosure, which may or may not also have a diffusion layer formed therein. For example, at least one outer layer may be applied on a gripping surface by methods including electro-deposition, laser metal deposition, laser sintering, physical vapor deposition (PVD), chemical vapor deposition (CVD), plasma-assisted processes, ion implantation, or any powder metallurgy process. Further, coatings may be formed of non-ferrous material, including, for example, cobalt alloys, tungsten and tungsten alloys such as doped tungsten, molybdenum alloys, titanium alloys, nickel alloys, and copper alloys or may include diamond-like coatings. In some embodiments, diamond, cubic boron nitride, polycrystalline cubic boron nitride and/or other ultrahard material may be impregnated into an outer layer. Such ultrahard material particles impregnated into a coating may range in size from nano-scale to micro-scale.

One or more embodiments may include a diamond impregnated coating according to embodiments of the present disclosure. In one or more embodiments, diamond particles may be impregnated within a coating material, which may include, for example, at least one of nickel, cobalt, tungsten, molybdenum, iron, ceramics, and polymers. Diamond particles may have a size ranging from a lower limit selected from any of 1 nm, 10 nm, 100 nm, 1,000 nm, 10 microns, and 100 microns to an upper limit selected from any of 100 nm, 10 microns, 100 microns and 800 microns. The size of diamond particles imbedded into a coating material may be selected depending on the thickness of the coating being applied as an outer layer on a gripping surface. Further, as shown, diamond particles may be exposed at the outer surface of the coating material, or diamond particles may be entirely immersed in the coating material. The diamond impregnated coating may be deposited on the outer surface of a gripping element that has already undergone one or more of the processing methods disclosed herein, such as on a diffusion layer formed in the outer surface of the gripping element. In other embodiments, the diamond impregnated coating may be deposited directly to a base material of a gripping element, i.e., a gripping surface that has not already undergone a surface processing method. In some embodiments, the diamond impregnated coating may be deposited to an outer surface of a gripping element formed by additive manufacturing, which is described more below.

The thickness of a coating applied to the gripping surface of a gripping tool may vary depending on the type of material being coated and the method of application to the gripping surface. For example, in some embodiments, a coating applied as an outer layer to a gripping surface by a thin film deposition method, such as chemical vapor deposition, physical vapor deposition, electro-deposition, or atomic layer deposition, may have a thickness ranging from about 10 nanometers to about 1.5 mm. In some embodiments, a coating applied as an outer layer to a gripping surface may have a thickness greater than about 1.5 mm.

Further, one or more coatings may be applied as an outer layer to a gripping surface to provide increased hardness. For example, in some embodiments, a gripping surface may have two or more layers formed thereon, in which the two or more layers may be formed on the gripping surface in an order of increasing hardness i.e., the outer layer forming the outer surface of the gripping surface has a hardness greater than an adjacent layer formed distal from the outer surface. In some embodiments, a coating may be applied to a carburized layer formed on the gripping surface, in which the coating has a hardness greater than the carburized layer, and the carburized layer has a diffusion-type gradient of decreasing hardness that transitions to the body of the gripping tool. In some embodiments, a second coating may be applied to a first coating (applied to a gripping surface prior to having the second coating applied thereto), in which the second coating forms the outer surface of the gripping surface and has a hardness greater than the hardness of the first coating, and in which the first coating has a hardness greater than the base material of the gripping surface.

According to embodiments of the present disclosure, one or more coatings, such as described above, may be applied to a carburized layer formed on a gripping surface. For example, a gripping surface of the present disclosure may include a plurality of teeth extending from a gripping tool body. The teeth may include side surfaces transitioning to an apex to penetrate and grip another material, such as CRA tubulars. Penetrating and gripping another material may induce compressive loads, among others, on the teeth. By providing the teeth with a carburized layer to support additional outer layers (such as those described above, including diffusion layers and coatings), the outer layers may have improved retention to the teeth, while also providing the teeth with increased hardness, wear resistance, lubricity, etc.

Gripping elements according to embodiments of the present disclosure may have an outer surface that is surface processed using one or more of the surface processing methods disclosed herein. For example, the outer surface of a gripping element may be subjected to one or more diffusion processes such that the outer surface of the gripping element is formed from a diffusion layer. In some embodiments, the outer surface of a gripping element may be subjected to one or more diffusion processes and subsequently coated using one or more other surface processing methods disclosed herein, such as applying one or more coatings to the outer surface. In yet other embodiments, the outer surface of a gripping element may be subjected to one or more surface processing methods disclosed herein that does not include a diffusion process. For example, in some embodiments, a gripping element that has not been subjected to a diffusion process may have one or more coatings applied to the outer surface of the gripping element. The one or more coatings may include, for example, diamond impregnated coating, diamond like carbon coating, and/or coating applied by CVD or PVD. Further, in any of the methods of surface processing described herein, the outer surface of the gripping element may undergo one or more cleaning processes, which are known in the art, prior to being surface processed.

In some embodiments, gripping elements may have a gripping surface formed of non-ferrous material, such as one or more of cobalt alloys, tungsten, tungsten alloys, molybdenum alloys, titanium alloys, nickel alloys, and copper alloys. For example, a gripping element may be formed with a non-ferrous material by extrusion, swaging, rolling, machining, forging, bulk powder metallurgy, additive manufacturing, such as described below, or any other bulk manufacturing process. Gripping elements may be entirely formed of non-ferrous material, or partially formed of non-ferrous material, wherein at least the gripping surface is made of non-ferrous material. Further, gripping elements having a gripping surface formed of non-ferrous material may be surface processed according to methods disclosed herein, or may not be surface processed.

Gripping elements formed according to embodiments disclosed herein may have a life span longer than conventionally formed gripping elements. For example, upon testing gripping elements formed according to embodiments of the present disclosure and conventionally formed gripping elements, the gripping elements formed according to embodiments described herein incurred less wear than the conventionally formed gripping elements.

Additive Manufacturing

According to one or more embodiments, a gripping element may be formed by additive manufacturing, which includes building up the gripping element layer by layer. For example, a gripping tool may include a gripping element with at least one gripping surface formed on the gripping element, wherein the gripping surface includes a plurality of teeth extending from the gripping element, an outer layer formed of a first material, and at least one inner layer formed between the outer layer and a base. In some embodiments, the first material may be a non-ferrous material. The base may be formed of a second material, different from the first material, and may be a ferrous or non-ferrous material.

Further, a gripping tool may include one, two, three or greater than three layers formed on a base of the gripping element using additive manufacturing. For example, a gripping element may be formed by applying sequential layers of the same or different materials by extruding each layer on top of the previous layer. In some embodiments, one or more layers may be applied by heating or fusing a layer of powdered material to the previous layer. Materials used to form one or more layers in additive manufacturing a gripping element may include ferrous and/or non-ferrous materials, such as one or more types of steels, titanium alloys, cobalt alloys, nickel chromium alloys, molybdenum alloys, or other alloys. For example, in some embodiments, a gripping element may be formed entirely of non-ferrous material by additive manufacturing. In other embodiments, a gripping element may be formed of ferrous material layers and non-ferrous material layers, wherein one or more non-ferrous material layers form the gripping surface of the gripping element.

Additive manufacturing may be used to create a gripping element having layers of materials with varying hardness. For example, in some embodiments, one or more inner layers of a gripping element may be formed with one or more materials having an average hardness that is less than the average hardness of the material forming the outer layer of the gripping element. In some embodiments, additive manufacturing may be used to create a gripping element having layers of materials with varying amounts of iron. For example, a gripping element may have one or more inner layers formed with one or more materials having an iron content greater than the iron content of the material forming the outer layer of the gripping element. Various combinations of materials may be used to form a gripping element layer by layer. Advantageously, by using additive manufacturing to form a gripping element, the gripping element may include varying material properties throughout the thickness of the gripping element. For example, gripping elements formed layer by layer having different average hardness values for each layer may have a harder outer layer and relatively tougher inner layers.

Gripping elements formed by additive manufacturing may or may not be surface processed according to methods described herein. For example, a gripping element formed layer by layer may be chemically surface processed by a diffusion process, such as one or more of a carburizing process, boronizing process, or nitridizing process, and/or may be coated by one or more coating methods described above. As referred to herein, layers formed during additive manufacturing are different from layers formed from coating processes. Additive manufacturing layers are layers that are formed during the manufacturing of the gripping element, while coating layers are applied to an already formed gripping element. Additive manufacturing layers may be thicker than coating layers. For example, in some embodiments, additive manufacturing layers may have thicknesses in a macro-level range, such as a millimeter or more, while coating layers may have thicknesses in a micro level range, such as in the micron or nanometer range. Further, in some embodiments, additive manufacturing layers may be formed with a common or integral material shared throughout two or more layers, while coating layers are applied separate or non-integrally with adjacent layers. For example, in some embodiments, a gripping element may be formed by additive manufacturing that includes layering two or more types of powdered materials and infiltrating the layers of powdered materials with a binder. In such embodiments, the layers may have varying compositions that are integrally formed and bonded with a single binder. After forming such gripping elements, they may be coated or otherwise surface processed according to methods disclosed herein.

Methods described herein used to surface process teeth of a gripping surface according to embodiments of the present disclosure may reduce or prevent the transfer of residual free iron otherwise present at the surface of a non-treated gripping surface to the material being gripped, such as CRA tubulars. For example, a non-treated gripping surface may transfer an amount of ferrous material to a CRA material being gripped. The transferred ferrous material may result in, among other things, eventual corrosion of the CRA material. However, by forming one or more layers (e.g., a diffusion layer and/or a coating) on the teeth of a gripping surface according to embodiments of the present disclosure, the layers may act as a buffer, thereby preventing transfer of ferrous material beyond the maximum allowable limit to the CRA material.

Figure 5:
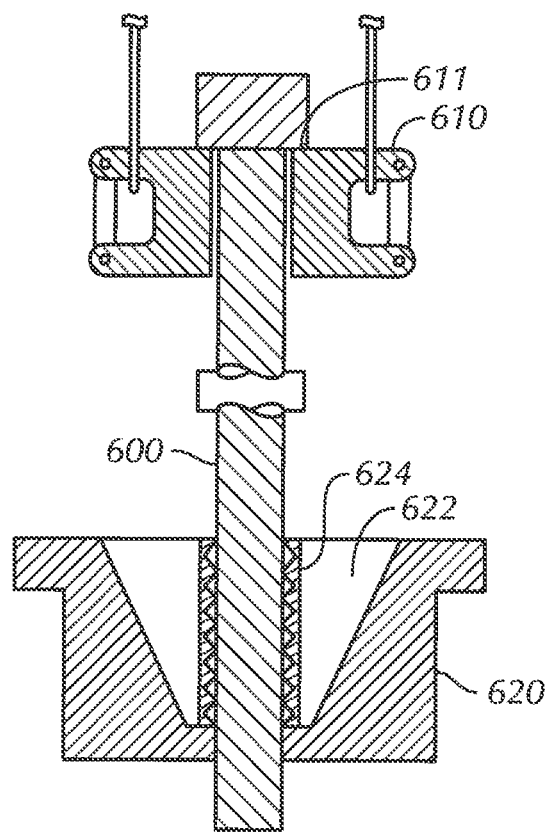
FIG. 5 shows a cross sectional view of a pipe handling system including a collar-support-type elevator and a slip-type gripping tool at the rig floor elevation according to embodiments of the present disclosure.
Figure 6:
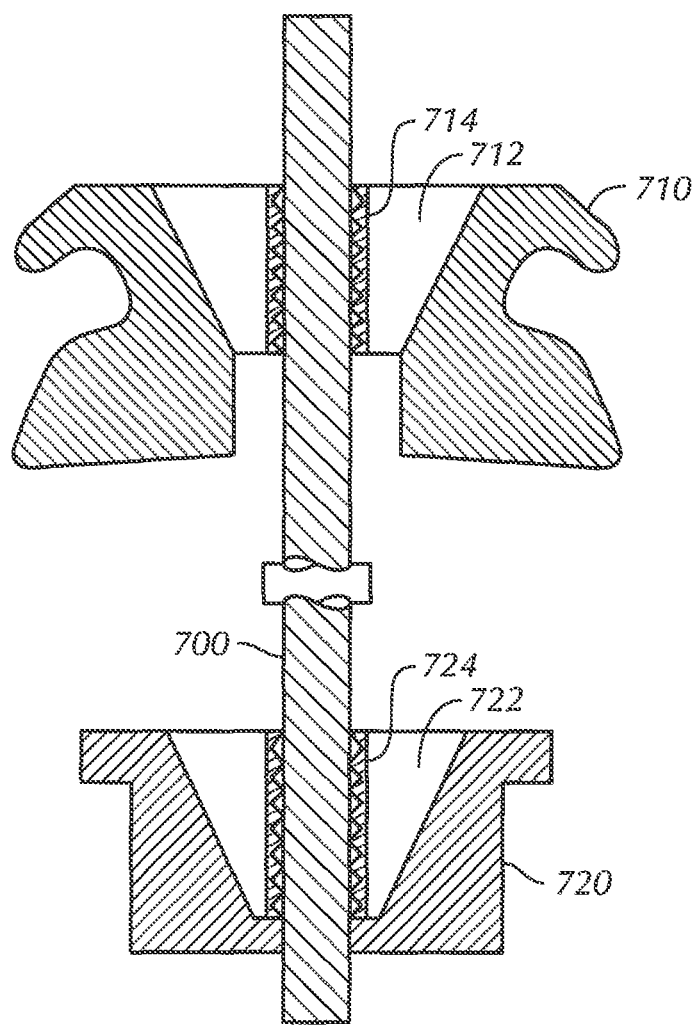
FIG. 6 shows a cross sectional view of a pipe handling system including a slip-type elevator and a slip-type gripping tool at the rig floor elevation according to embodiments of the present disclosure.

Further, one or more embodiments of the present disclosure may be used in combination with other embodiments of the present disclosure. For example, one or more layers (e.g., a diffusion layer and/or a coating) may be formed on the teeth of a gripping surface used in a first component for gripping tubular members, while a second component used in combination with the first component for gripping tubular members may have a either the same or different layers formed on its teeth. FIGS. 5 and 6 show cross-sectional views of examples of different gripping components that may be used in slip assemblies according to embodiments of the present disclosure; however, other combinations or components used alone may be used to grip tubular members with gripping surfaces having teeth formed as described above. As shown in FIG. 5, a tubular member 600 may be supported with a side-door elevator 610 and a slip-type gripping spider 620, where the elevator supports the tubular member 600 by supporting the tubular 600 via the lower load face of the coupling 611 attached to the upper extremity of the tubular member, and where the spider 620 includes a slip assembly 622 and a gripping surface 624 according to embodiments described herein. In one or more embodiments, the gripping surface 624 may be manufactured or treated according to any of the methods discussed above. As shown in FIG. 6, a tubular member 700 may be gripped with a slip type elevator 710 and a slip type spider 720, where both the elevator slip assembly 712 and the spider slip assembly 722 have an insert 714, 724, respectively, with a gripping surface according to embodiments of the present disclosure. The gripping surface used in the elevator insert 714 may be the same or different than the gripping surface used in the spider insert 724. For example, one or more gripping surfaces may be non-metallic or may include one or more coatings over a carbon steel substrate material. Further, in one or more embodiments, one or more gripping surfaces may be formed from other materials other than carbon steel and may include ferrous and/or non-ferrous alloys with or without inserts. In one or more embodiments, one or more of the material treatments discussed above may also apply to the use for tong dies.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A gripping tool comprising:
   a gripping element;
   at least one gripping surface formed on the gripping element wherein the at least one gripping surface comprises:
   a plurality of teeth extending from the gripping element;
   an outermost layer extending a depth from an outer surface of the gripping element, wherein the outermost layer is created by the diffusion or deposition of elements selected from the group consisting of chromium, carbon, nitrogen, boron, cobalt, tungsten, molybdenum, nickel, copper, aluminum, silicon, titanium, or vanadium, alone or in combinations thereof;
   an intermediate layer extending a depth from the inner surface of the outermost layer of the gripping element, wherein the intermediate layer is created by the diffusion of elements selected from the group consisting of boron, chromium, carbon, nitrogen, cobalt, tungsten, molybdenum, nickel, copper, aluminum, silicon, titanium, or vanadium, alone or in combinations thereof;
   an innermost layer extending a depth from the inner surface of the intermediate layer of the gripping element to a substrate material of the gripping surface, wherein the innermost layer is created by the diffusion of elements selected from the group consisting of carbon, chromium, nitrogen, boron, cobalt, tungsten, molybdenum, nickel, copper, aluminum, silicon, titanium, or vanadium, alone or in combinations thereof.

2. The gripping tool of claim 1, wherein the hardness of the innermost layer is greater than the hardness of the substrate material, the hardness of the intermediate layer is greater than the hardness of the innermost layer, and the hardness of the outermost layer is greater than the hardness of the intermediate layer.

3. A gripping tool comprising:
   a gripping element;
   at least one gripping surface formed on the gripping element wherein the at least one gripping surfaces comprises:
   a plurality of teeth extending from the gripping element;
   an outermost layer extending a depth from an outer surface of the gripping element, wherein the outermost layer is created by a chromizing process;
   an intermediate layer extending a depth from the inner surface of the outer layer of the gripping element, wherein the intermediate layer is created by a boriding process;

an innermost layer extending a depth from the inner surface of the intermediate layer of the gripping element to a substrate material of the gripping surface, wherein the innermost layer is created by the diffusion of carbon.

4. The gripping tool of claim 3, wherein the substrate material of the gripping surface is a low carbon content material selected from the group consisting of plain carbon steel, mild steel, resulfurized steel, low carbon steel, medium carbon steel, low alloy steel, chromium alloy steel, chromium-molybdenum alloy steel, chromium-nickel-molybdenum alloy steel, nickel chromium alloys, and nickel molybdenum alloys.

5. The gripping tool of claim 3, wherein the substrate material of the gripping surface is carburizing steel.

6. The gripping tool of claim 3, wherein the innermost layer has a diffusion-type carbon gradient.

7. The gripping tool of claim 3, wherein the innermost layer has a hardness from 50 HRC to 65 HRC.

8. The gripping tool of claim 3, wherein the intermediate layer includes iron borides.

9. The gripping tool of claim 3, wherein the intermediate layer has a hardness from 900 HV to 2200 HV.

10. A method of manufacturing a gripping tool, comprising:
forming an innermost layer on a gripping surface of a gripping element by the diffusion of elements selected from the group consisting of carbon, chromium, nitrogen, boron, cobalt, tungsten, molybdenum, nickel, copper, aluminum, silicon, titanium, or vanadium, alone or in combinations thereof;
forming an intermediate layer on the innermost layer by the diffusion of elements selected from the group consisting of carbon, chromium, nitrogen, boron, cobalt, tungsten, molybdenum, nickel, copper, aluminum, silicon, titanium, or vanadium, alone or in combinations thereof;
forming an outermost layer on the intermediate layer by the diffusion or deposition of elements selected from the group consisting of carbon, chromium, nitrogen, boron, cobalt, tungsten, molybdenum, nickel, copper, aluminum, silicon, titanium, or vanadium, alone or in combinations thereof.

11. The method of claim 10, wherein one or more of forming the innermost layer, forming the intermediate layer, or forming the outermost layer comprises contacting the gripping surface with a diffusion material, wherein the diffusion material is selected from the group consisting of carbon, chromium, nitrogen, boron, cobalt, tungsten, molybdenum, nickel, copper, aluminum, silicon, titanium, or vanadium, alone or in combinations thereof, and heating the gripping surface at a temperature and a time to diffuse the diffusion material a depth into the gripping surface to form a diffusion layer.

12. The method of claim 11, wherein one or more of forming the innermost layer, forming the intermediate layer, or forming the outermost layer further comprises quenching the gripping surface.

13. A method of manufacturing a gripping tool, comprising:
forming an innermost layer on a gripping surface of a gripping element by the diffusion of carbon;
forming an intermediate borided layer on the innermost layer;
forming an outermost chromized layer on the intermediate layer.

14. The method of claim 13, wherein forming the innermost layer comprises heating the gripping surface in a carbon rich environment to a carburizing temperature, to allow the carbon to diffuse into a base material, for a time period that is proportional to a thickness of the innermost layer.

15. The method of claim 14, wherein the carbon rich environment has a vacuum applied thereto.

16. The method of claim 13, wherein forming the intermediate layer comprises heating the gripping surface in the presence of a boron source such that boron diffuses into the gripping surface.

17. The method of claim 16, wherein the boron source is selected from the group consisting of a powder pack, a paste, a salt, and a gas, alone or in combinations thereof.

18. The method of claim 13, wherein the gripping surface is heated to a temperature between 1300 degrees Fahrenheit and 1830 degrees Fahrenheit.

19. The method of claim 13, wherein forming the intermediate layer comprises boronizing the innermost layer and quenching the gripping surface.

* * * * *